Patented May 6, 1930

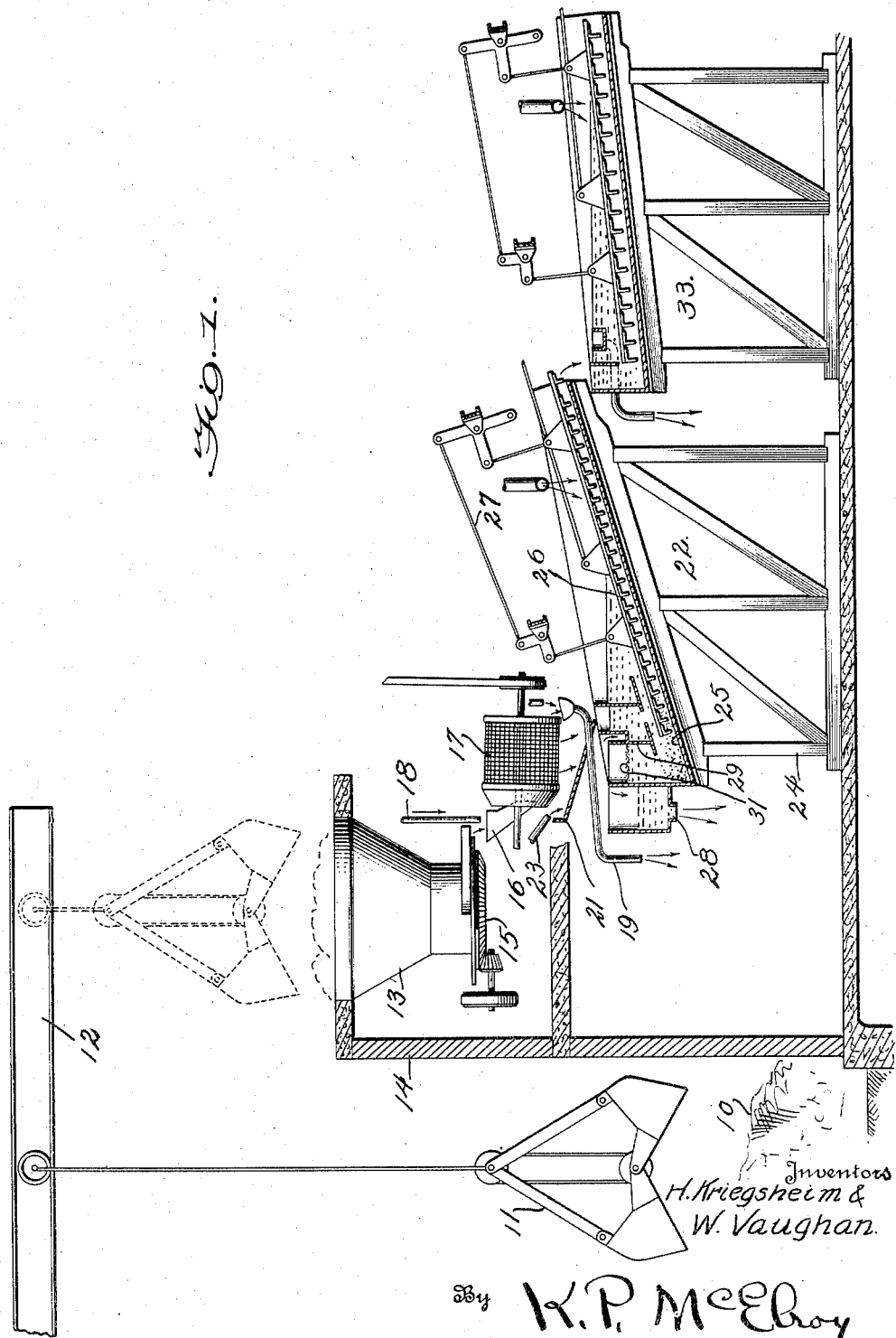

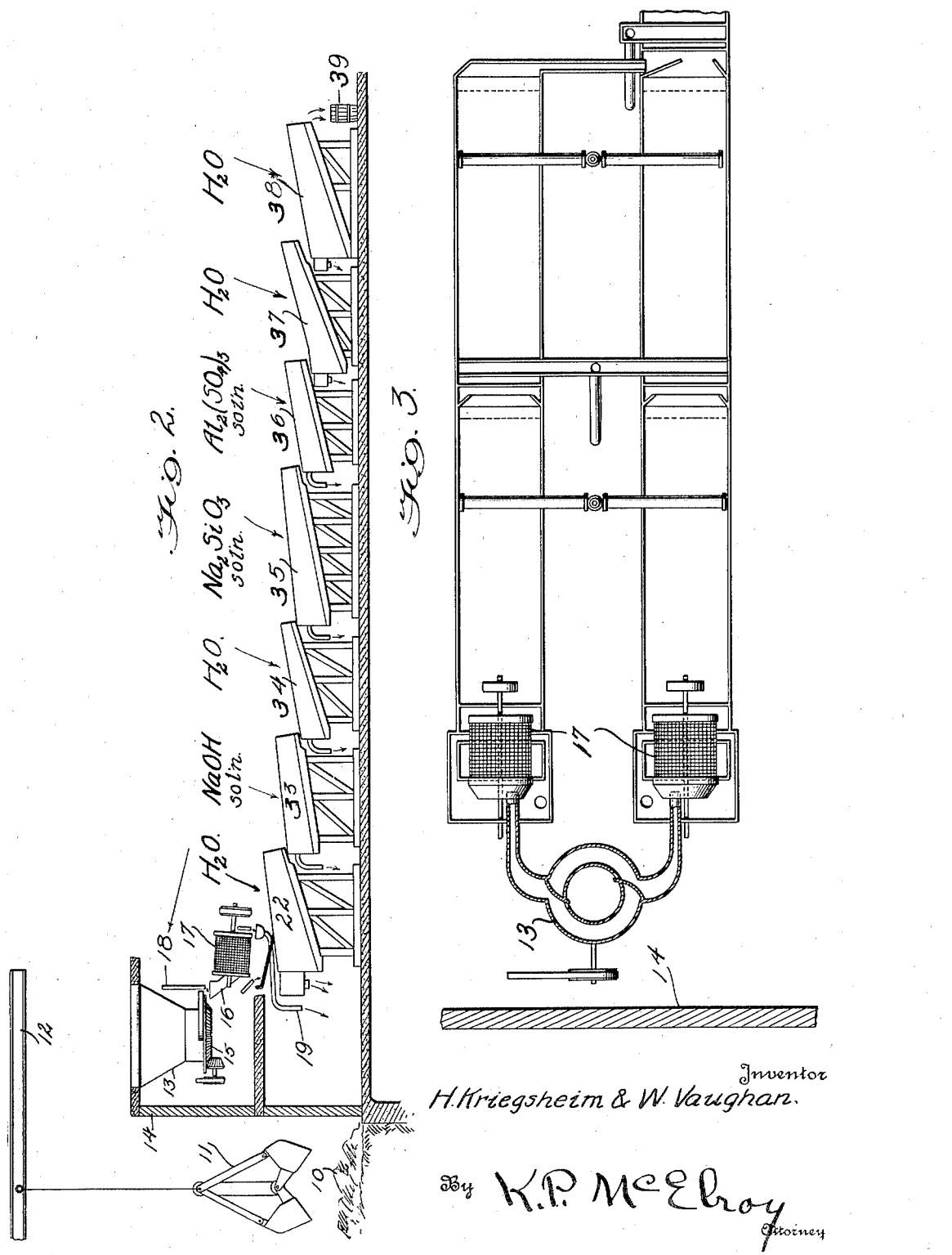

1,757,374

UNITED STATES PATENT OFFICE

HEINRICH KRIEGSHEIM, OF NEW YORK, AND WILLIAM VAUGHAN, OF BROOKLYN, NEW YORK, ASSIGNORS TO THE PERMUTIT COMPANY, OF NEW YORK, N. Y., A CORPORATION OF DELAWARE

METHOD OF OBTAINING PURE GLAUCONITE

Application filed February 4, 1928. Serial No. 251,799.

This invention relates to methods of obtaining pure glauconite; and it comprises a methodical series of mechanical and chemical purifying operations applied to natural greensand to isolate and recover grain glauconite of normal character therefrom, free of adhering and absorbed impurities, said series of operations being adapted to deliver a product in large scale operation consisting of substantially pure glauconite grains, these operations comprising screening, cleaning, scrubbing and "classifying" greensand in the presence of water to remove oversize and undersize material and to remove clay, mud and mechanical impurities as nearly as may be from the sized material, then scrubbing the washed glauconite in the presence of hot weak caustic soda solution to remove humus and alkali impurities, as well as to aid in breaking up and removing composite abnormal granules, thereafter scrubbing with water to remove alkali, thereafter scrubbing in a solution of sodium silicate to effect a further purifying action, thereafter scrubbing with a solution of aluminum sulfate to neutralize absorbed and adsorbed alkalinity and finally scrubbing in water to remove sulfate and deposited silica and silicate of alumina, etc.; all as more fully hereinafter set forth and as claimed.

Greensand is a native material containing as its characteristic mineral component, the mineral known as glauconite; a hydrated double silicate of iron and potassium. Normal glauconite occurs in dark green cryptocrystalline, more or less lamellar, granules having a hardness between 2 and 3 on Moh's scale. In good greensand, such as that yielded by various deposits in New Jersey, granular glauconite constitutes most of the material but it is never wholly composed of glauconite; there are always other materials present; clay, sand, pyrites, etc., etc. And not all of the contained granular glauconite is of what may be called normal character. There are granules of abnormal character; those in which "glauconitization" has apparently not gone to completion. The current theory of the formation of glauconite is that it is a marine alteration product formed in muddy ocean water; clayey granules being altered by sea water, and perhaps life actions, to produce the particular iron-potassium silicate called "glauconite". This alteration process is called "glauconitization". Grains can be found exhibiting all gradations between a clay granule and those which are composed mainly or entirely of normally developed crypto-crystalline grains of the mineral glauconite. Even these normally developed grains from the circumstances of formation, usually carry more or less "mud" on their surfaces; amorphous substances occurring as a coating. Several small grains are sometimes stuck together to a composite granule by this amorphous material. Greensand in nature being in contact with the "soil solution", and glauconite being a mineral of strong adsorptive properties, even granules of pure glauconite moreover carry proportions of soluble impurities taken up from the soil solution; among these being humus bodies.

Glauconite, or greensand containing it, has come into extensive use for softening water; and for this purpose, it has certain recognized advantages in some relations, over the ordinary types of water softening zeolites. Also, it has certain recognized disadvantages. In a pervious bed softener, a charge of glauconite may give turbid softened water for a time; there is development of turbidity in water passing through the softener. Turbidity may result from clay or from the presence of material which, although of glauconite composition, it not in normal crystallized coarse granules, but is in a state of colloidal fineness. Sometimes, in the use of a glauconite softener the clay and the fines are temporarily flocculated but become again peptized later; resulting in the continuing development of turbidity for some time after the softener has been put in use. Granules of abnormal character or incompletely glauconitized material may break down with peptization in this way.

In the prior art, many efforts have been made to obviate the noted difficulties in the use of the natural greensand. Sometimes, the material is baked, sometimes, it is baked and sifted to get rid of colloidal components; and sometimes efforts have been made to stick the colloidal matters together with some sort of binder, such as silicate of soda or the like. For the most part, in these proposed methods, the natural greensand, as high in glauconite as possible, is taken and used as a raw material, being merely screened and washed to free it of coarse material and of fines. Most of these prior art methods claim an incident improvement in the exchange power (the power of softening hard water) and such an improvement often results, and particularly in the case of greensand of rather low grade.

Most of these prior art propositions are, we believe, however, attempts to correct difficulties arising from the use of greensand as such; of the greensand as it occurs in nature and containing imperfectly glauconitized material and dirty glauconite granules. In our opinion, most of the difficulties recorded in the prior art have been due to the attempts to use unclean glauconite.

We have found, as a result of extensive experience, that better results are obtained in softening water by using clean normal glauconite as nearly as possible of its original and normal chemical and physical character as may be; and in the present invention, instead of attempting to change the character of the greensand as a whole, we isolate and collect from it pure, clean, normal grains of glauconite. The material is subjected to vigorous mechanical scrubbing in various liquids; thereby disaggregating and removing everything but the normal glauconite granules. The process of our invention is really a drastic cleaning and scouring operation intended to get rid of everything which is not normal glauconite. The material is subjected to vigorous mechanical scrubbing in various liquids; thereby disintegrating and removing everything but sound glauconite granules. By the terms, viborous scouring and vigorous scrubbing, is meant such a treatment as will not only rub from the surface of the normal pure glauconite granules any mud, clay or other adherent impurities, but will also break down mechanically agglomerates or partially glauconitized material. Such broken down material is washed away by the various liquids used. Pure and sound normal glauconite granules survive such vigorous scrubbing and scouring and are recovered as the final product. The undesirable materials present do not survive the drastic cleaning and scouring operation and are washed away. The final product is a directly marketable and usable material not requiring any subsequent chemical treatment.

It is our object to procure a body of pure, normally developed glauconite granules without chemical addition or subtraction; there being merely the removal of fines, of low grade material and of adventitious impurities, soluble and insoluble. The isolated clean glauconite we use in purifying water.

There is plenty of available greensand containing large proportions of glauconite in grains of normal composition and character and in our invention we use such material; merely separating and cleaning these grains.

In the present invention, we submit natural, high grade greensand to a methodical succession of purifying operations, the several operations being intended to get rid of composite, undeveloped or abnormal glauconite, as well as to remove mechanical impurities, such as clay, and to remove all soluble impurities. To this end, we subject high grade natural greensand to a series of mechanical purifications, these purifications including cleaning and vigorous scrubbing in contact with successive baths of different character. In these treatments we get rid of abnormal, oversize and undersize grains and free the retained grains severally of absorbed, adsorbed and adhering impurities but we do not cause the glauconite to take up anything from the treating chemicals, nor do we remove or change any of the chemical constituents of normal glauconite. Several of the steps used in this procedure we have elsewhere described and claimed in treating glauconite for other purposes. Our present invention is in the entire succession of steps.

In another and prior Patent No. 1,538,247, we have described and claimed a method of getting rid of turbidity in the softener and producing a purer glauconite in which raw glauconite is simply washed a number of times with alternating flows of soft water and salt solution. This breaks down incompletely glauconitized peptizable granules and removes clay, and finally produces a material which consists of glauconite granules which are mechanically pure and are free of adventitious turbidity-giving mechanical impurities. The glauconite, however, is not thereby freed of chemical impurities to such an extent as is desirable.

In another prior and copending application, Serial No. 28,011, filed May 4, 1925, we have described and claimed a method of abstracting soluble impurities, including humus from glauconite which comprises a treatment with weak caustic soda solution. Caustic soda is, however, apt to extract some of the silica of the mineral; and in another and copending application, Serial No. 589,276, filed September 19, 1922, we have described and claimed a method wherein purification is effected by a solution of sodium silicate. Treatment with either caustic soda solution or sodium silicate solution gives the granules an enhanced exchange power due to the adsorption of Na compounds; but as we have now found, this improvement in the exchange powers while substantial in the case of some lower grades of glauconite, in the case of normal glauconite is usually only temporary. With high grade glauconite after a time in use in the softener, the excess Na is lost and the glauconite comes back to the ordinary exchange power of normal glauconite. We do not utilize this temporary enhancement in exchange power in the present invention. In the last mentioned copending application, Serial No. 589,276, we obviate alkalinity left in the glauconite by the silicate of soda by the subsequent use of an acid reacting material; ordinarily aluminum sulfate. The aluminum sulfate treatment, however, leaves the glauconite containing some excess silica, as well as, probably, alumina. Under the microscope, flaky deposited silica can be seen in the glauconite. This silicate treatment is also attended with a temporary increase in exchange power. In the present invention, in so far as any silica is deposited in the glauconite it is afterwards removed.

As stated ante, we have found that, on the whole, pure normally developed glauconite granules in their natural condition, but as absolutely pure as may be, are best adapted for softening purposes, and in the procedure of the present invention, while we use the reagents recited in the acknowledged art, we use them in a somewhat different way and couple their use with vigorous mechanical scrubbing. As stated, we do not now here care to either subtract or add to the glauconite chemically; it is our object to produce a material consisting of normal glauconite granules, as clean as may be but otherwise in their natural condition.

In the procedure which we have found best adapted to the mass production of clean normally developed glauconite granules, free of fines and clay and of adsorbed impurities coming from the soil solution, using a good quality excavated greensand, we first screen the greensand in a current of water, using a rotating screen device. This removes coarse impurities, such as gravel, lumps of pyrite and lumps of conglomerated and agglomerated material as well as oversize granules of glauconite. Material suitable for our purposes goes forward with the current of water to the first scrubber. Material passing through the screen with water is allowed to deposit the coarser glauconite granules while fines, clay, etc., go foward with the current of water. The sized material is next thoroughly scrubbed with water. In the screen and in this first scrubbing operation, water at the ordinary temperature is used. For the scrubbing operation, we employ an inclined table with reciprocating scrapers for advancing solids upward over the table against a countercurrent of water. By this methodical countercurrent operation with the glauconite conveyed upward with vigorous agitation through a downflow of water, we are able to purify 1.85 cubic feet of crude greensand of the average quality with about 100 cubic feet of water. This treatment gets rid of most of the clay and fine impurities, as well as the undersized glauconite granules. Composite granules are broken up to a large extent. After water scrubbing, we next advance the glauconite in a similar way and by a similar mechanism against a flow of quite dilute hot caustic soda solution; ordinarily of a strength of about 1° Bé. This solution is used as hot as is convenient. Ordinarily, it reaches the table at about 200° F. and leaves it at about 160° F. This soda solution is intended to remove humus and alkali-soluble impurities, but no chemical change is effected in normal glauconite granules; probably, not even superficially. The glauconite surfaces, however, do take up some alkali by adsorption and some of the soft composite granules are broken down and removed by the conjoint chemical action of the alkali and the scrubbing. After the alkali treatment, we next wash with cold water again, by a similar apparatus. For the initial quantity of 1.85 cubic feet of glauconite in this second water, 20 cubic feet of water will generally suffice to remove all mechanically held soda solution. After this washing, we next give the glauconite a similar comparatively long traverse through a hot weak solution of sodium silicate of about 3° Bé. This waterglass solution is of alkaline character and it also has an extracting power on any humus which the soda extraction may have left. The silicate solution further replaces any silica which may have been superficially removed by the caustic soda. The sodium silicate solution is not used quite as hot as the caustic soda solution. A temperature of the inflowing solution of about 160° F. with a temperature of 140° F. at the outflow are about right. After passing through the sodium silicate solution, the glauconite is next moved in a similar way through a cold dilute solution of ordinary commercial sulfate of alumina; usually, of about 1° Bé. This neutralizes adsorbed alkali taken up from the caustic soda solution and from the sodium silicate solution. But it also produces some flakes of silica mechanically adhering to the material. After the aluminum sulfate wash, we therefore give the glauconite a drastic scrubbing with water at the ordinary temperature to get rid of this adhering silica. Customarily, we wash in two stages, using about 20 cubic feet of water for the first washing and about 55 cubic feet for the next. After the second washing, we regard the glauconite as sufficiently pure for softener purposes. It is drained, rough dried and packaged or used. The product, with the quantities mentioned, is usually about 1.1 cubic feet of clean hard glauconite in grains of a size appropriate for use in a pervious bed. The product is composed of clean green granules showing under the microscope no surface coating and having the normal optical and physical properties of the pure mineral glauconite. The granules scratch gypsum and are scratched by calcite, and, therefore, have a hardness between 2 and 3 on Moh's scale. They are harsh to the touch, as compared with ordinary uncleaned glauconite granules, being freed of the superficial coating of the latter; a coating which gives them a comparatively smooth feel. They are practically non-porous and their exchange power is superficial only; an advantageous fact in some relations. The exchange power of the glauconite, i. e., the amount of CaO, or its equivalent, taken up by 100 weight units of dry glauconite in contact with a large excess of $CaCl_2$ solution is about 0.5 weight units, while the softening capacity, i. e., the weight of hardness-forming constituents expressed as CaO which are removed from hard water passing through layers of glauconite in producing water of zero hardness for practical purposes is about 0.35 per cent. of the weight of glauconite layers used.

Suitable apparatus for conducting the process of this invention is shown in the accompanying drawing, wherein;

Fig. 1 is a view partly in vertical cross section and partly in elevation of apparatus elements used initially in treating glauconite;

Fig. 2 is a diagrammatic view in vertical elevation of all of the apparatus elements employed in the process; and Fig. 3 is a plan view of the apparatus elements shown in Fig. 2.

Greensand or glauconite, as taken from the earth, is conducted to the apparatus by any suitable means, being dumped in a suitably located pile 10, from which it may be removed by a bucket conveyor 11 forming a part of a traveling crane 12. The bucket 11 conveys raw greensand to the mouth of a hopper 13 supported above the washing tables by means of suitable framework 14. The hopper 13 is provided with discharging mechanism 15 which may be operated from any suitable source of power (not shown) to permit of the transfer of the greensand in regulated quantities into a chute 16 conducting the material into a rotary screening device 17.

A pipe line 18 conducts water into the rotary screen 17 and so permits of a thorough initial washing of the greensand as it is agitated by the revolving of the screen 17. This combined washing and agitating operation serves to remove superficial dirt and impurities from the raw greensand, which impurities are carried away by the effluent stream of water passing out of the member 17 and to waste through the pipe line 19. The mesh of the screen is such as to permit of the passage of granules of desired size therethrough, but to retain large pieces of material which are not desired in the finished product. These are discharged from the drum 17 into the conduit 19.

The granules of desired size passing through the drum 17 are caught on an inclined shelf 21 from which they slide into a washing apparatus and scrubbing apparatus indicated generally by the reference numeral 22, their transfer being assisted by means of a stream of wash water entering through a pipe 23. The scrubber 22 is an apparatus element of well known type, being referred to in the art as an ore treating table, and so needs but limited description here. As indicated in Fig 1, the table consists of a support 24 upon which is mounted an inclined shallow tank 25 containing a rake 26 which is agitated in a lateral direction by means of suitably driven and arranged moving elements 27. The greensand coming from the drum 17 passes into the lower portion of the tank 25 and is slowly and progressively drawn to the upper portion of the table by means of the action of the rake 26. During this action the greensand is subjected to the washing action of the water coming in through the pipe 23 and which leaves the apparatus through exit port 28 disposed beyond a baffle plate 29 and a screen 31 which prevent the escape of the greensand grains. This washing and scrubbing operation further serves to remove various superficial impurities.

The washed greensand leaving the scrubber 22 falls over into an adjacent and similar scrubber 33 and is there subjected to a like operation. The washing liquor in this event however is not pure water but a dilute and warm solution of caustic soda, the effect of which is to remove such matters as humus. It has been found that solutions of common salt or alkali metal carbonates may also be used as the next washing solution, but for most purposes solutions of caustic soda are more advantageous. Material leaving the scrubber 33 is transferred to a similar scrubber 34 where it is washed with water to remove excess caustic. Thereafter, the material is successively washed with solutions of sodium silicate and aluminum sulfate, as previously described, in suitably disposed scrubbers 35 and 36. The final operation consists in subjecting the material to a thorough washing with water in the scrubbers 37 and 38, by means of which all chemical treating agents are removed. Such treatment leaves the greensand in a cleaned and purified condition which is delivered to a suitable container 39 and is ready for use.

As indicated in Fig. 3, it is possible to assemble the various scrubbing units to supply two separate units from the same source. It will be understood, of course, that the arrangement, dimensions, and number of units, as well as the quantities of water or chemical agents used, are all matters of practical plant operation, and that these details do not constitute the essence of the invention. Any suitable arrangement may be employed, the object being to remove everything from the material taken from the earth which is not pure glauconite.

What we claim is:

1. The method of recovering glauconite in the form of pure, clean and unaltered natural grains of normal composition, which comprises sizing and mechanically scrubbing greensand in a series of successive flows of water and of chemical solutions adapted to remove absorbed and adsorbed impurities.

2. The method of producing pure glauconite grains adapted for softening water which comprises subjecting greensand to a vigorously scouring and sizing action in the presence of water, vigorously scouring with weak alkali to remove humus, vigorously scouring with sodium silicate solution to restore any removed silica, removing residual sodium silicate and drastically scrubbing with water.

3. In the preparation of pure, unaltered glauconite for water softening purposes the process which comprises successively sizing and vigorously scrubbing in the presence of water, vigorously scrubbing in the presence of weak hot caustic soda solution, vigorously scrubbing in the presence of weak sodium silicate solution, vigorously scrubbing in the presence of an acid reacting solution and finally vigorously scrubbing with water; all to the end of removing lumpy, oversized and undersized material and of scrubbing the residual normal granular glauconite free of adventitious foreign matters adhering thereto and absorbed or adsorbed thereby.

In witness whereof we have hereunto affixed our signatures.

HEINRICH KRIEGSHEIM.
WILLIAM VAUGHAN.